US010012823B2

United States Patent
Yamasaki

(10) Patent No.: US 10,012,823 B2
(45) Date of Patent: Jul. 3, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Shinji Yamasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 15/224,974

(22) Filed: Aug. 1, 2016

(65) Prior Publication Data
US 2017/0052353 A1   Feb. 23, 2017

(30) Foreign Application Priority Data
Aug. 21, 2015 (JP) ................................. 2015-163564

(51) Int. Cl.
*G02B 15/14* (2006.01)
*G02B 15/173* (2006.01)

(52) U.S. Cl.
CPC .................. *G02B 15/173* (2013.01)

(58) Field of Classification Search
CPC ....... G02B 15/173; G02B 13/22; G02B 15/14
See application file for complete search history.

(56) References Cited

U.S. PATENT DOCUMENTS

| | | | | | |
|---|---|---|---|---|---|
| 4,991,942 | A | * | 2/1991 | Fujibayashi | G02B 15/173 359/690 |
| 5,227,919 | A | * | 7/1993 | Yano | G02B 15/173 359/687 |
| 5,978,150 | A | * | 11/1999 | Hamanishi | G02B 15/173 359/683 |
| 6,104,548 | A | * | 8/2000 | Nakayama | G02B 15/173 359/690 |

FOREIGN PATENT DOCUMENTS

| | | |
|---|---|---|
| JP | H04324812 A | 11/1992 |
| JP | 2002131640 A | 5/2002 |

OTHER PUBLICATIONS

Machine translation of Hodaka, JP 2002131640 A, May 9, 2002.*

* cited by examiner

*Primary Examiner* — Bumsuk Won
*Assistant Examiner* — Balram Parbadia
(74) *Attorney, Agent, or Firm* — Rossi, Kimms & McDowell LLP

(57) ABSTRACT

Provided is a zoom lens, including, in order from an object side to an image side: a first lens unit having a positive refractive power; a second lens unit having a negative refractive power; and a third lens unit having a positive refractive power. In the zoom lens, during zooming, the first lens unit is configured not to move, and the second lens unit and the third lens unit are configured to move along mutually different loci, and a focal length (fw) of the zoom lens at a wide angle end, a focal length (ft) of the zoom lens at a telephoto end, a focal length (f2) of the second lens unit, and a focal length (f3) of the third lens unit are appropriately set.

15 Claims, 11 Drawing Sheets

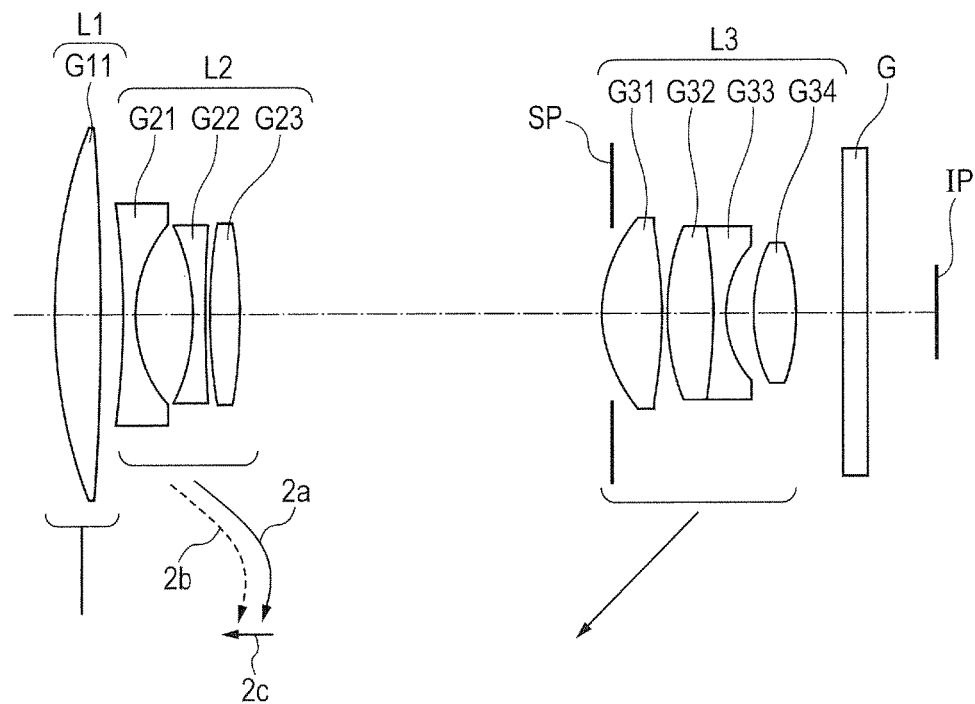
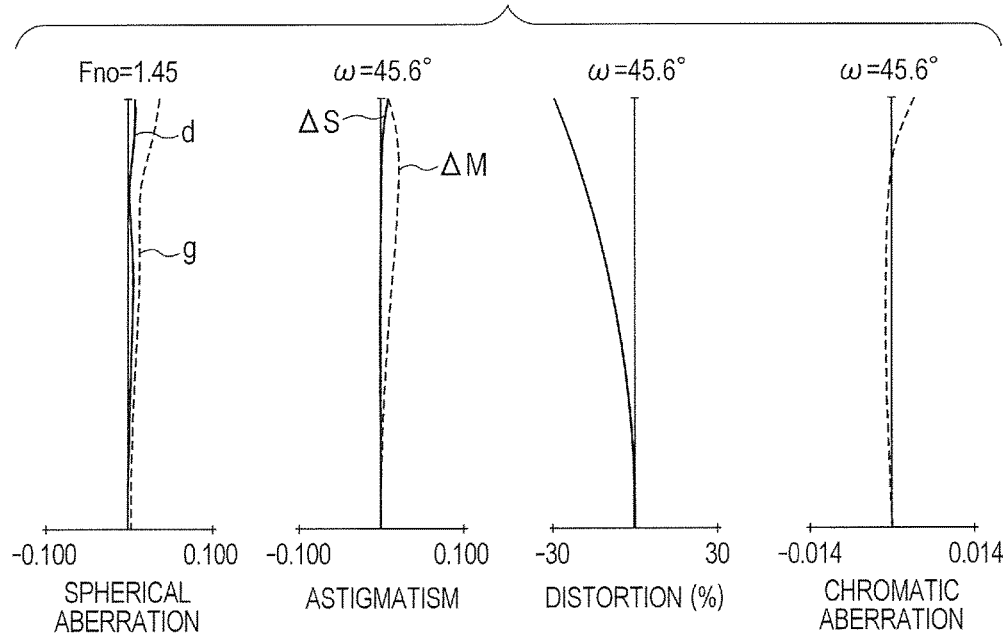

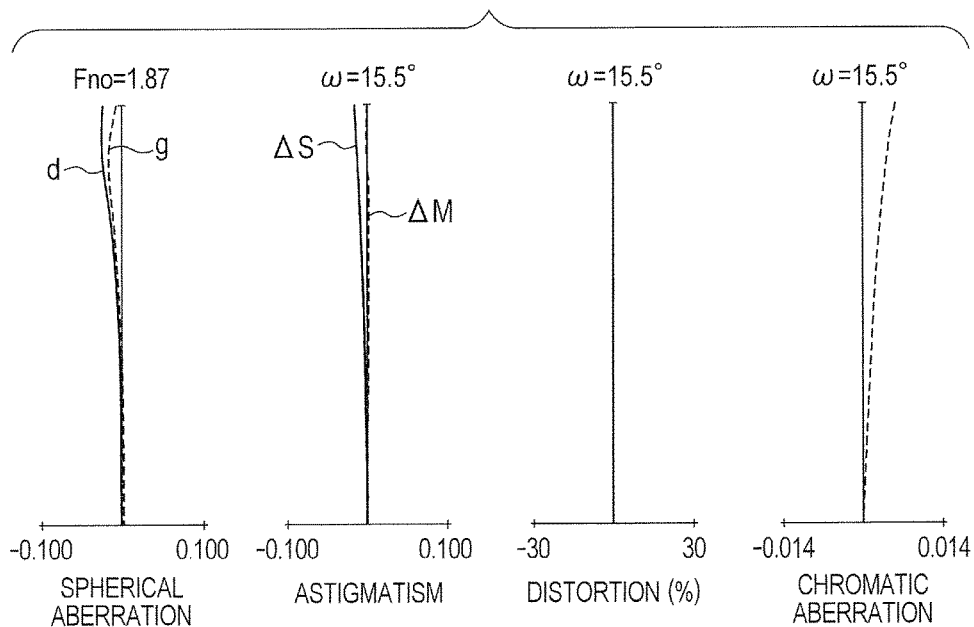
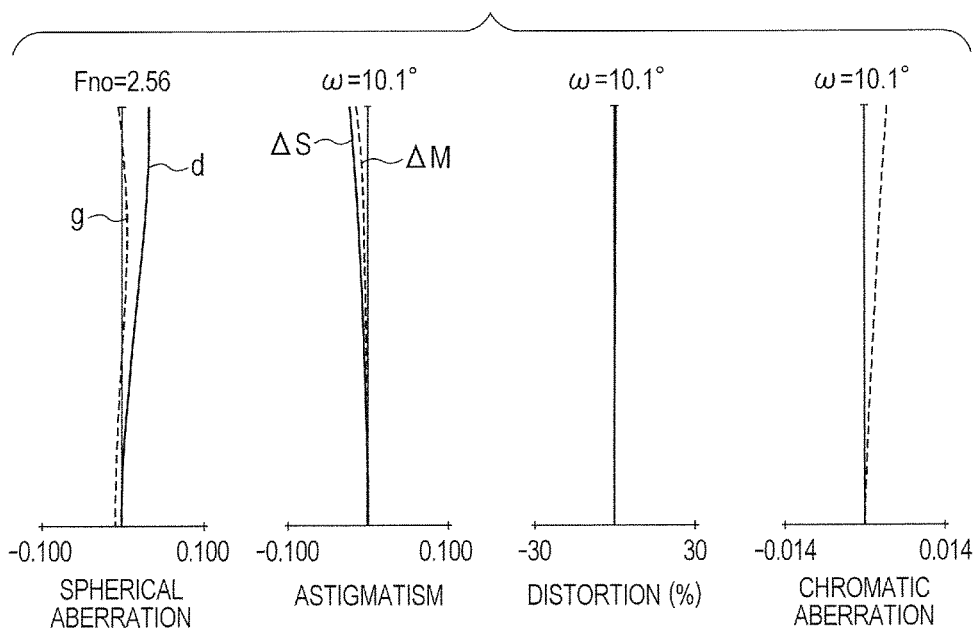

ZOOM LENS AND IMAGE PICKUP APPARATUS INCLUDING THE SAME

BACKGROUND OF THE INVENTION

Field of the Invention

The present invention relates to a zoom lens, for example, to a zoom lens suitable as an image pickup optical system to be used in an image pickup apparatus, such as a video camera, a monitoring camera, a digital still camera, and a broadcasting camera.

Description of the Related Art

As image pickup optical systems to be used in image pickup apparatus using image pickup elements, zoom lenses having high optical characteristics and a wide angle of view have been demanded. For example, zoom lenses to be mounted on monitoring cameras have been desired to achieve a small entire system and a wide angle of view that enables monitoring of a wide area with one camera.

Besides the above demands, in view of an increase in image quality of monitoring cameras, the monitoring cameras, which have had a standard definition (SD) image quality, have been demanded to have full high-definition (HD) or 4K in recent years, and zoom lenses having high resolving power have accordingly been desired. In addition, zoom lenses have been desired to have a small F number in order to satisfactorily take images under an environment with a small light amount.

In order to satisfy those demands, there has been known a three-unit zoom lens including, in order from an object side to an image side, a first lens unit having a positive refractive power, a second lens unit having a negative refractive power, and a third lens unit having a positive refractive power. In each of Japanese Patent Application Laid-Open No. 2002-131640 and Japanese Patent Application Laid-Open No. H4-324812, there is disclosed a three-unit zoom lens in which during zooming, a first lens unit is configured not to move, and a second lens unit and a third lens unit are configured to move along mutually different loci.

In order to obtain, with the three-unit zoom lens described above, high optical characteristics over the entire zoom range while achieving a small entire system and a wide angle of view, it is important to appropriately set refractive powers and the lens structures of the respective lens units, and the like. In particular, it is important to appropriately set the refractive power and the lens structure of the second lens unit, the refractive power and the lens structure of the third lens unit, movement amounts of the second lens unit and the third lens unit during zooming, and the like.

SUMMARY OF THE INVENTION

According to one embodiment of the present invention, there is provided a zoom lens, including, in order from an object side to an image side:

a first lens unit having a positive refractive power;
a second lens unit having a negative refractive power; and
a third lens unit having a positive refractive power, in which during zooming, the first lens unit is configured not to move, and the second lens unit and the third lens unit are configured to move along mutually different loci, and in which the following conditional expressions are satisfied:

$-3.20 < f2/fw < -1.88$; and $0.35 < \sqrt{(-f2 \times f3)}/ft < 0.65$, where fw represents a focal length of the zoom lens at a wide angle end, ft represents a focal length of the zoom lens at a telephoto end, f2 represents a focal length of the second lens unit, and f3 represents a focal length of the third lens unit.

Further features of the present invention will become apparent from the following description of exemplary embodiments with reference to the attached drawings.

BRIEF DESCRIPTION OF THE DRAWINGS

FIG. 1 is a lens cross-sectional view and a diagram of movement loci at a wide angle end of a zoom lens according to Example 1 of the present invention.

FIG. 2A is an aberration diagram at the wide angle end of the zoom lens of Example 1.

FIG. 4B is an aberration diagram at an intermediate zoom position of the zoom lens of Example 2.

FIG. 4C is an aberration diagram at a telephoto end of the zoom lens of Example 2.

DESCRIPTION OF THE EMBODIMENTS

Preferred embodiments of the present invention will now be described in detail in accordance with the accompanying drawings.

Now, a zoom lens and an image pickup apparatus including the zoom lens of the present invention are described. The zoom lens of the present invention includes, in order from an object side to an image side: a first lens unit L1 having a positive refractive power; a second lens unit L2 having a negative refractive power; and a third lens unit L3 having a positive refractive power. During zooming, the first lens unit L1 is configured not to move, and the second lens unit L2 and the third lens unit L3 are configured to move along mutually different loci.

Figure 2B:
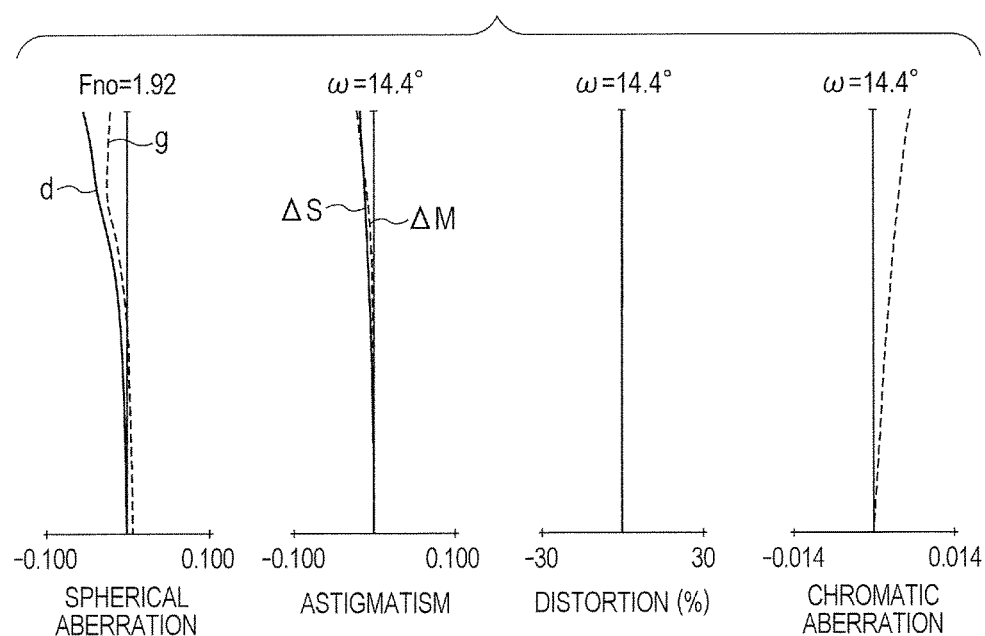
FIG. 2B is an aberration diagram at an intermediate zoom position of the zoom lens of Example 1.
Figure 2C:
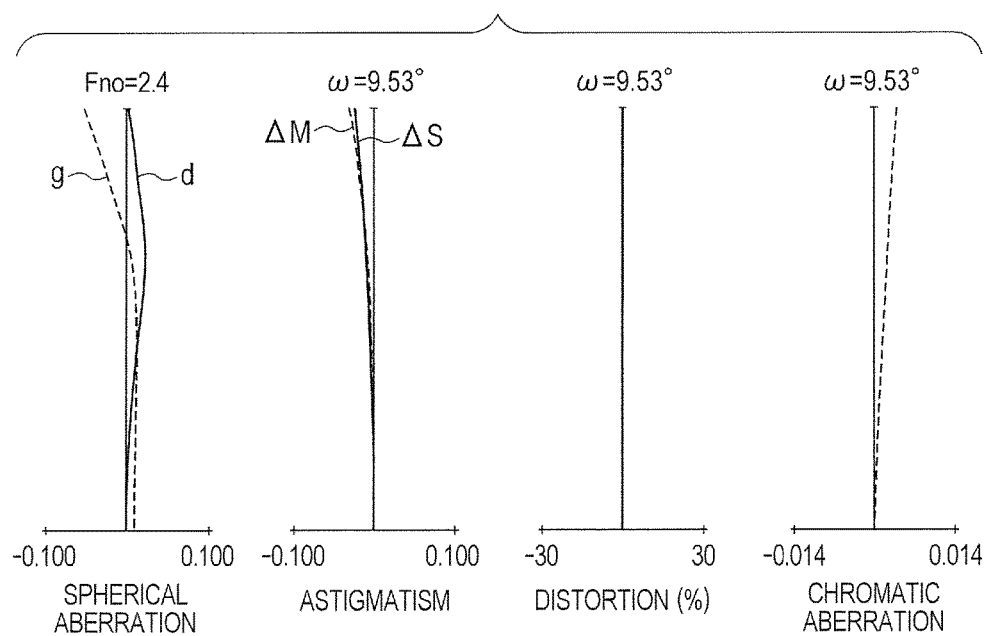
FIG. 2C is an aberration diagram at a telephoto end of the zoom lens of Example 1.

FIG. 1 is a lens cross-sectional view at a wide angle end (short focal length end) of a zoom lens according to Example 1 of the present invention. FIG. 2A, FIG. 2B, and FIG. 2C are aberration diagrams at the wide angle end, an intermediate zoom position, and a telephoto end (long focal length end), respectively, of the zoom lens according to Example 1 of the present invention. The zoom lens according to Example 1 has a zoom ratio of 4.30 and an aperture ratio (F number) of from 1.45 to 2.40.

Figure 3:
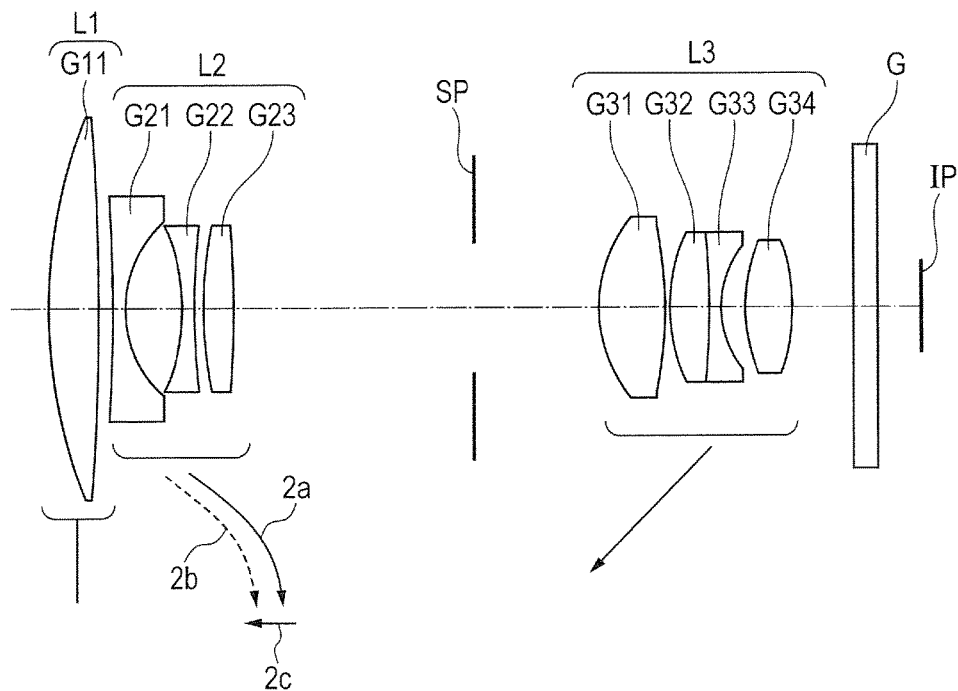
FIG. 3 is a lens cross-sectional view and a diagram of movement loci at a wide angle end of a zoom lens according to Example 2 of the present invention.
Figure 4A:
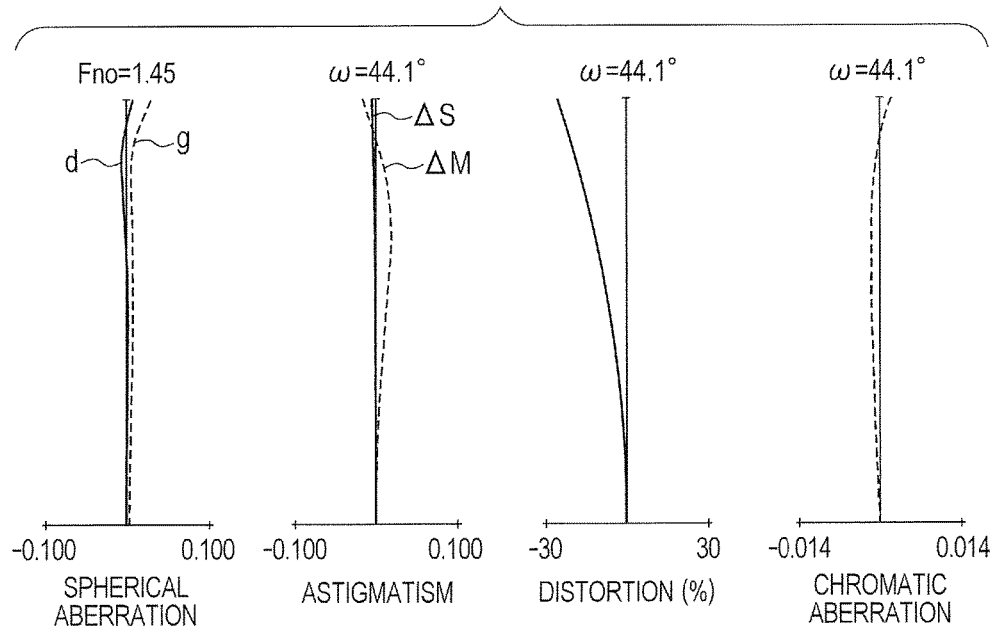
FIG. 4A is an aberration diagram at the wide angle end of the zoom lens of Example 2.

FIG. 3 is a lens cross-sectional view at a wide angle end of a zoom lens according to Example 2 of the present invention. FIG. 4A, FIG. 4B, and FIG. 4C are aberration diagrams at the wide angle end, an intermediate zoom position, and a telephoto end, respectively, of the zoom lens according to Example 2 of the present invention. The zoom lens according to Example 2 has a zoom ratio of 4.02 and an aperture ratio of from 1.45 to 2.56.

Figure 5:
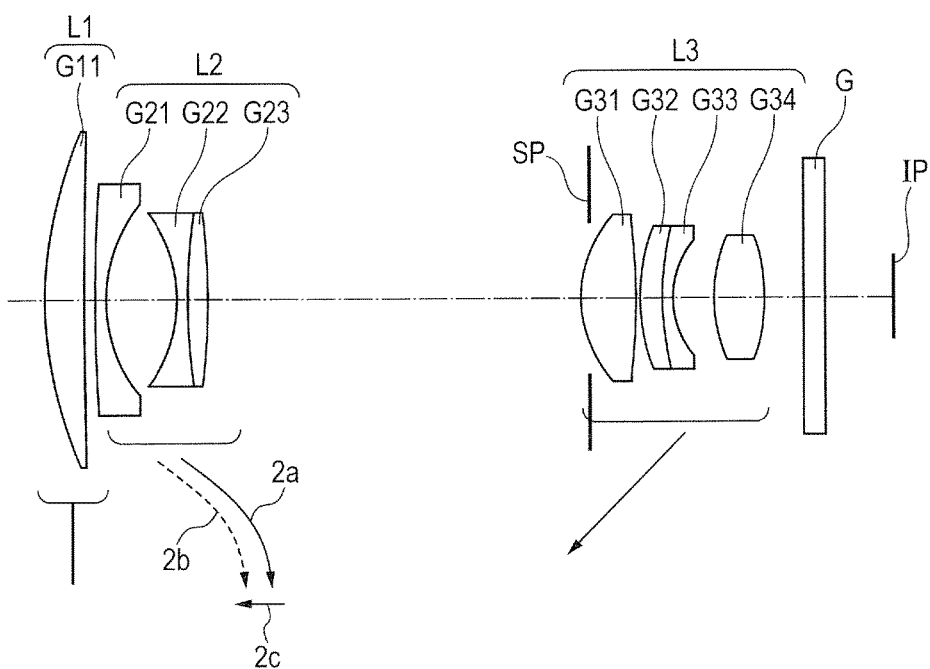
FIG. 5 is a lens cross-sectional view and a diagram of movement loci at a wide angle end of a zoom lens according to Example 3 of the present invention.
Figure 6A:
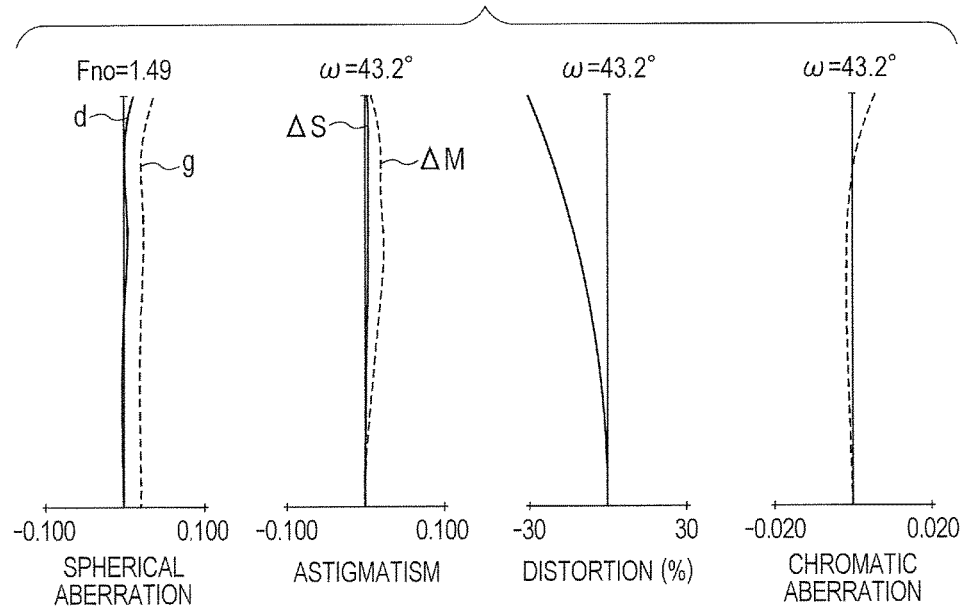
FIG. 6A is an aberration diagram at the wide angle end of the zoom lens of Example 3.
Figure 6B:
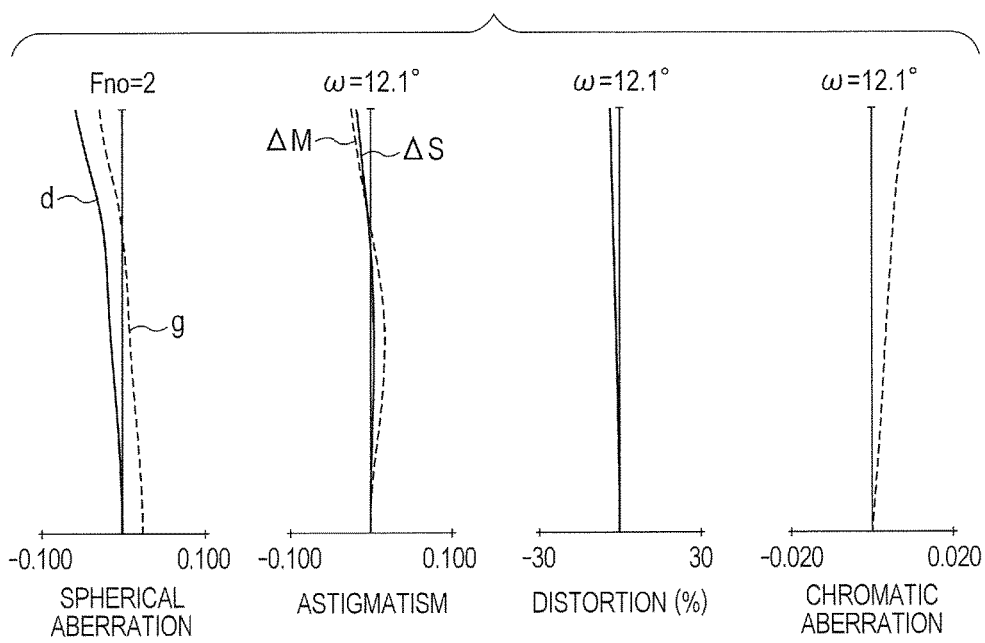
FIG. 6B is an aberration diagram at an intermediate zoom position of the zoom lens of Example 3.
Figure 6C:
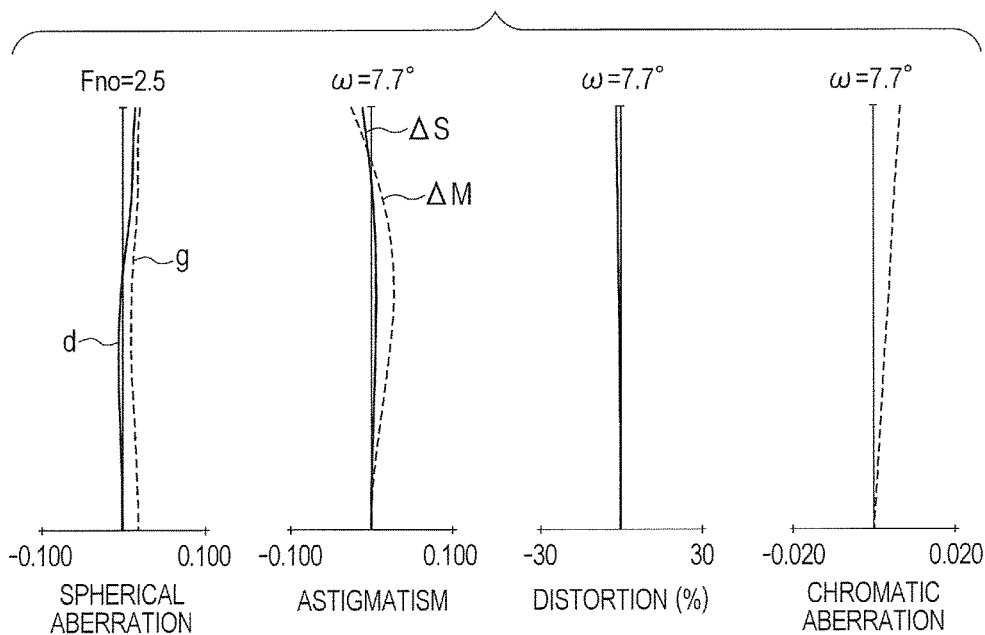
FIG. 6C is an aberration diagram at a telephoto end of the zoom lens of Example 3.

FIG. 5 is a lens cross-sectional view at a wide angle end of a zoom lens according to Example 3 of the present invention. FIG. 6A, FIG. 6B, and FIG. 6C are aberration diagrams at the wide angle end, an intermediate zoom position, and a telephoto end, respectively, of the zoom lens according to Example 3 of the present invention. The zoom lens according to Example 3 has a zoom ratio of 4.94 and an aperture ratio of from 1.49 to 2.50.

Figure 7:
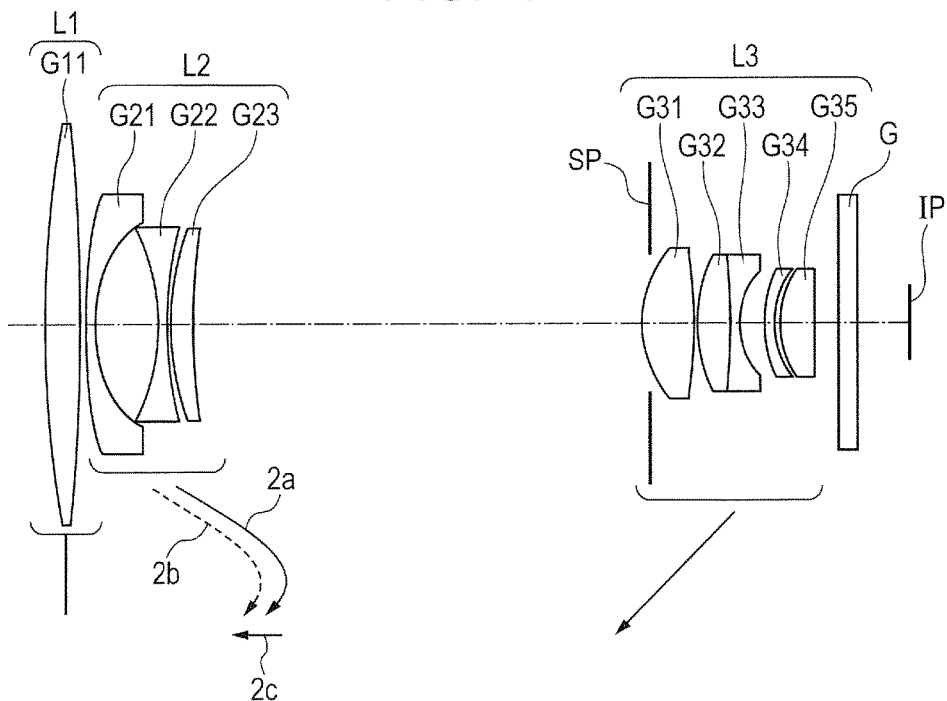
FIG. 7 is a lens cross-sectional view and a diagram of movement loci at a wide angle end of a zoom lens of Example 4.
Figure 8A:
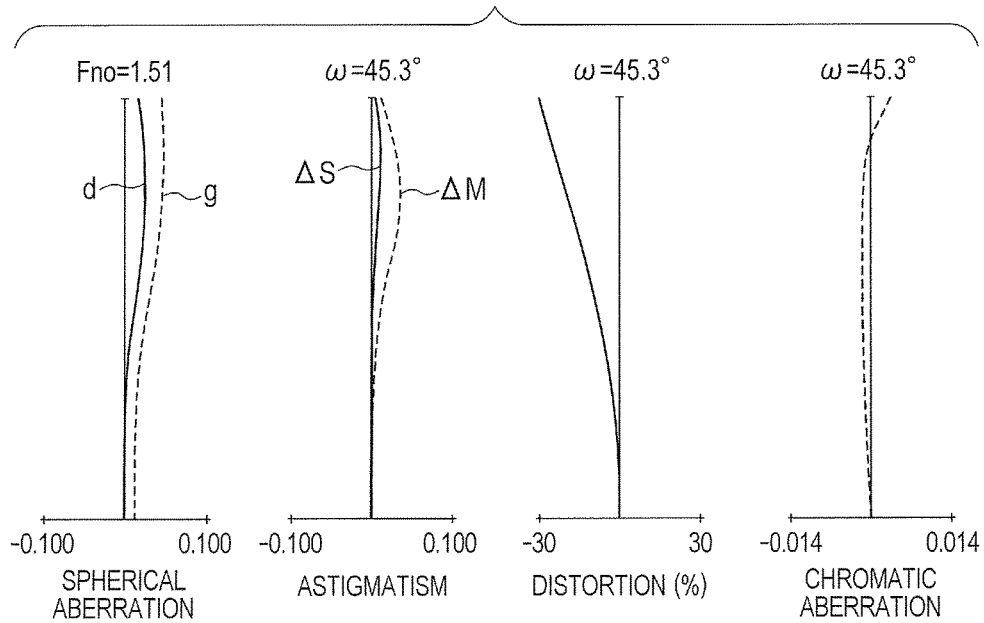
FIG. 8A is an aberration diagram at the wide angle end of the zoom lens of Example 4.
Figure 8B:
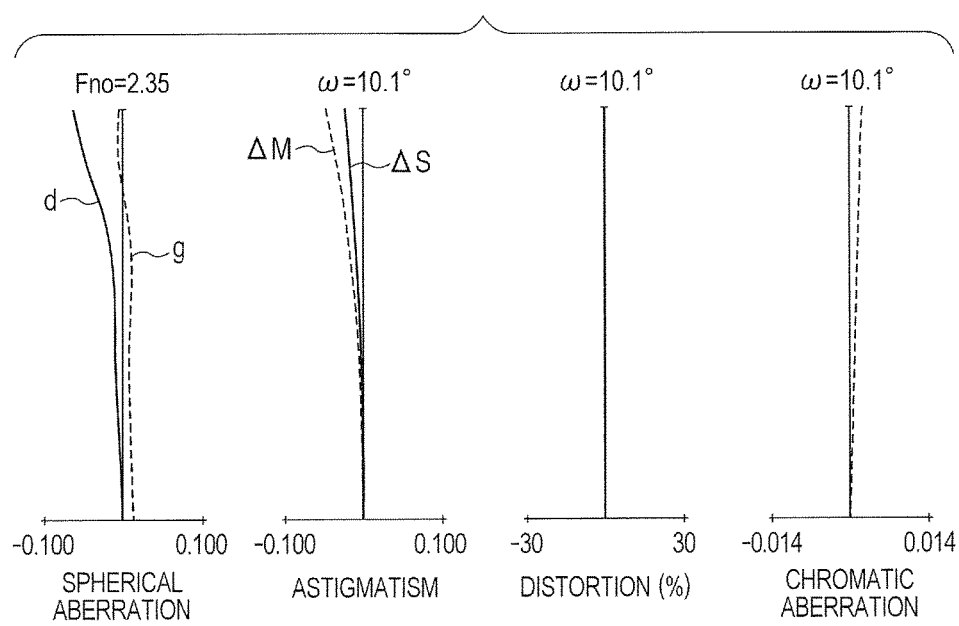
FIG. 8B is an aberration diagram at an intermediate zoom position of the zoom lens of Example 4.
Figure 8C:
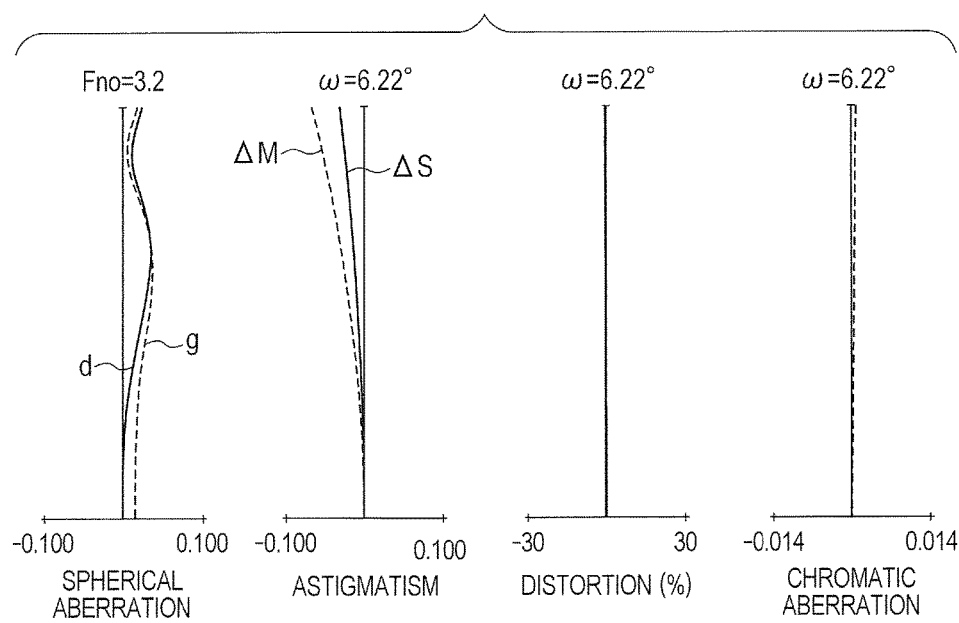
FIG. 8C is an aberration diagram at a telephoto end of the zoom lens of Example 4.

FIG. 7 is a lens cross-sectional view at a wide angle end of a zoom lens according to Example 4 of the present invention. FIG. 8A, FIG. 8B, and FIG. 8C are aberration diagrams at the wide angle end, an intermediate zoom position, and a telephoto end, respectively, of the zoom lens according to Example 4 of the present invention. The zoom lens according to Example 4 has a zoom ratio of 6.52 and an aperture ratio of from 1.51 to 3.20.

Figure 9:
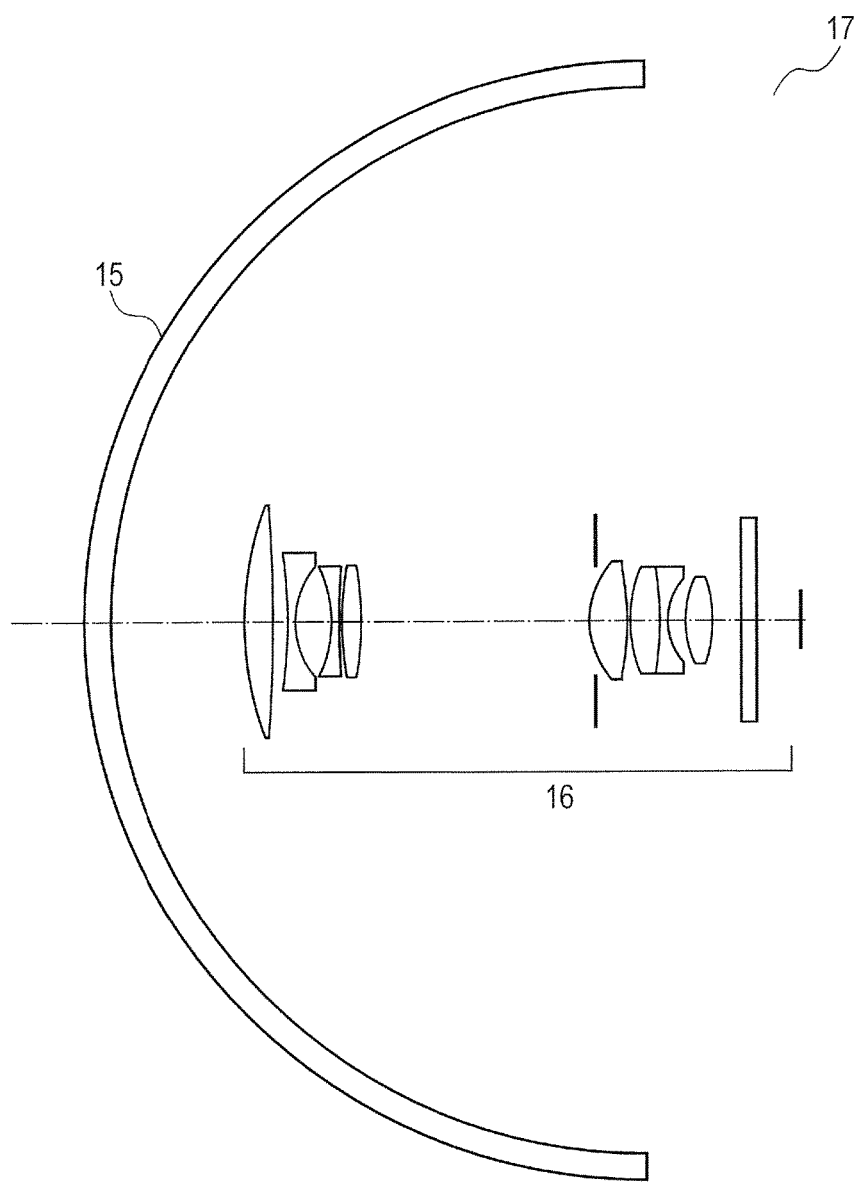
FIG. 9 is a lens cross-sectional view of a state in which the zoom lens according to Example 1 is covered with a dome cover.
Figure 10A:
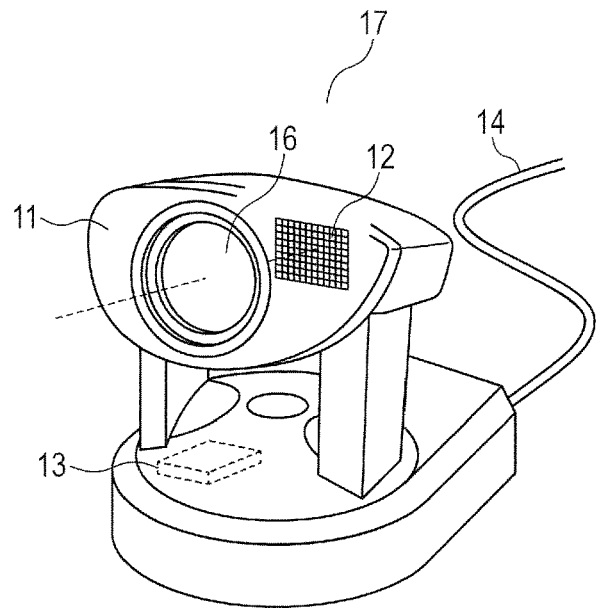
FIG. 10A is a schematic view of a main part of a monitoring camera having the zoom lens according to the present invention mounted thereon.
Figure 10B:
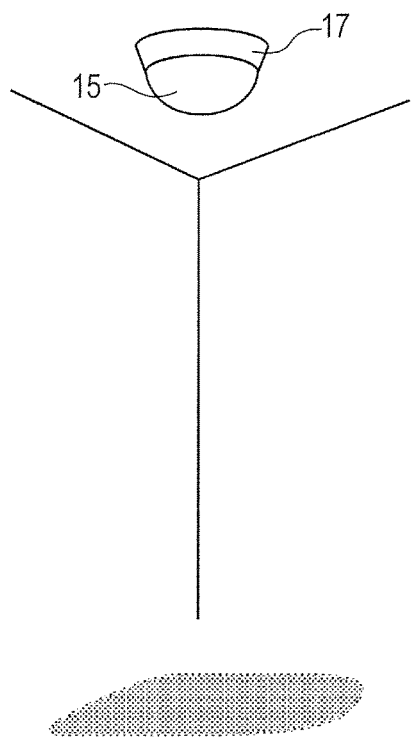
FIG. 10B is a schematic view of a main part of a monitoring camera having the zoom lens according to the present invention mounted thereon.
Figure 11:
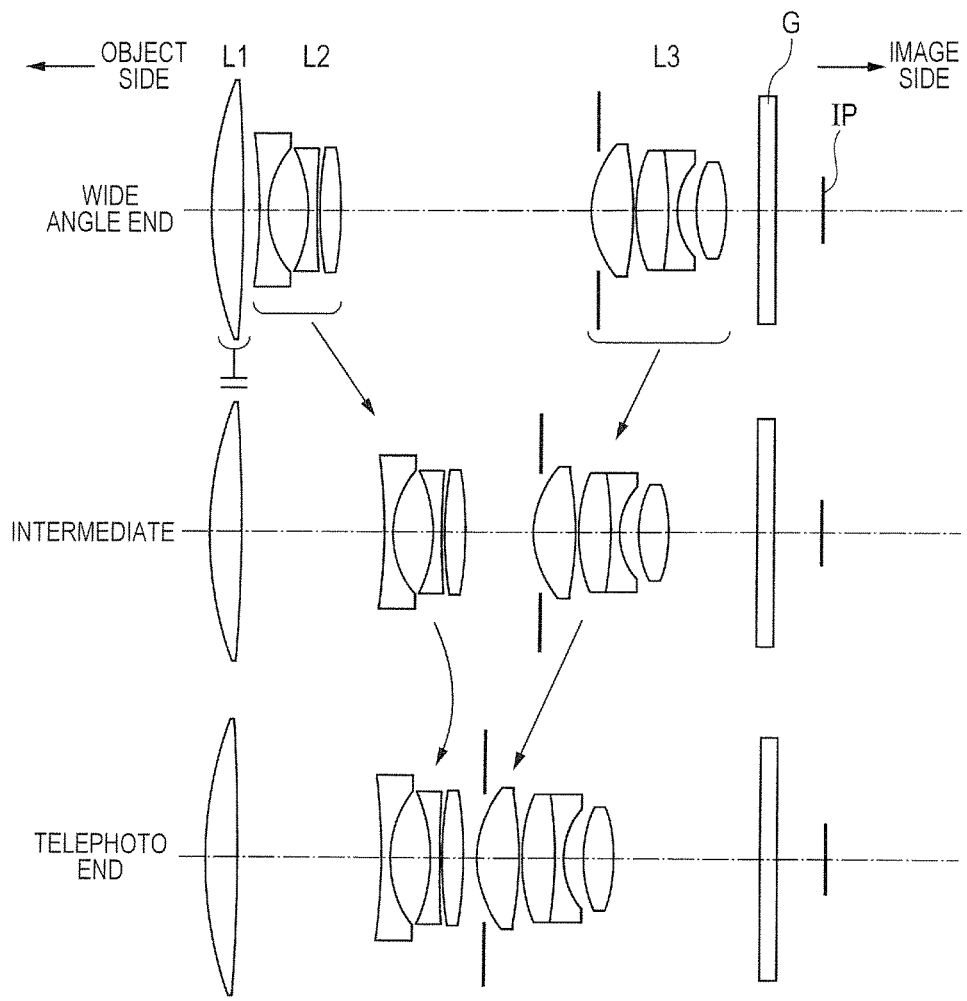
FIG. 11 is an explanatory diagram of movement loci of respective lens units of the zoom lens of the present invention for zooming.

FIG. 9 is an explanatory view of a state in which the zoom lens of the present invention is covered with a dome cover. Each of FIG. 10A and FIG. 10B is a schematic view of a main part of an image pickup apparatus having the zoom lens of the present invention mounted thereon. FIG. 11 is an explanatory diagram of movement loci of the respective lens units of the zoom lens of the present invention for zooming.

In the lens cross-sectional views, the left side is the object side (front side), and the right side is the image side (rear side). In the lens cross-sectional views, a first lens unit having a positive refractive power (optical power=reciprocal of a focal length) is denoted by L1, a second lens unit having a negative refractive power is denoted by L2, and a third lens unit having a positive refractive power is denoted by L3. An F number determination member (hereinafter referred to also as "aperture stop") SP has a function of an aperture stop for determining (limiting) an open F number (Fno) light flux. An optical block G corresponds to an optical filter, a face plate, a crystal low pass filter, an infrared cut filter, or the like.

As an image plane IP, an image pickup surface of a solid-state image pickup element (photo-electric conversion element), such as a CCD sensor or a CMOS sensor is arranged when the zoom lens is used as an imaging optical system of a video camera or a digital still camera. The arrows indicate movement loci of the lens units for zooming from the wide angle end to the telephoto end. The arrow 2a concerning the second lens unit L2 indicates a movement locus for zooming from the wide angle end to the telephoto end when focusing at infinity. Moreover, the arrow 2b indicates a movement locus for the zooming from the wide angle end to the telephoto end when focusing at short distance.

The arrow 2c indicates a movement direction of the second lens unit L2 for focusing from the infinity to the short distance. In the spherical aberration diagrams, reference symbols d and g represent a d-line (wavelength: 587.6 nm), a g-line (wavelength: 435.8 nm), respectively. In the astigmatism diagrams, a reference symbol ΔM represents a meridional image plane with respect to the d-line and a reference symbol ΔS represents a sagittal image plane with respect to the d-line. Reference symbols Fno and ω represent an F number and a half angle of field (degrees), respectively. The distortions for the d-line is shown. The lateral chromatic aberrations show aberrations of the g-line with respect to the d-line.

The zoom lens of each Example is a three-unit zoom lens including, in order from the object side to the image side, the first lens unit L1 having a positive refractive power, the second lens unit L2 having a negative refractive power, and the third lens unit L3 having a positive refractive power. The second lens unit L2 and the third lens unit L3 are configured to move along mutually different loci during zooming. The first lens unit L1 is configured not to move. Specifically, during the zooming from the wide angle end to the telephoto end, the second lens unit L2 is configured to move toward the image side and then move toward the object side, and the third lens unit L3 is configured to move toward the object side.

A zoom type of the zoom lens of the present invention is a three-unit structure. This zoom structure is configured to change intervals between adjacent lens units to vary magnification, and is suitable for obtaining high optical characteristics from the wide angle end to the telephoto end while downsizing the entire system.

How each lens unit is configured to move during zooming is described with reference to FIG. 11. During the zooming from the wide angle end to the telephoto end, the third lens unit L3 is configured to move monotonously from the image side to the object side to vary magnification, and at the same time, the second lens unit L2 is configured to move nonlinearly toward the image side or move along a locus convex to the image side. Each lens unit is configured to move as described above so that the interval between the second lens unit L2 and the third lens unit L3 can be sufficiently long at the wide angle end, to thereby facilitate the provision of a higher zoom ratio. Correction of image plane variation caused during varying magnification and focusing are performed through movement of the second lens unit L2 (compensator).

In the zoom lens of each Example, a focal length of the zoom lens at the wide angle end is represented by fw, a focal length of the zoom lens at the telephoto end is represented by ft, a focal length of the second lens unit L2 is represented by f2, and a focal length of the third lens unit L3 is represented by f3. In this case, the following conditional expressions are satisfied.

$$-3.20 < f2/fw < -1.88 \quad (1)$$

$$0.35 < \sqrt{(-f2 \times f3)}/ft < 0.65 \quad (2)$$

The technical meanings of the above-mentioned conditional expressions are described next. Conditional Expression (1) is intended to achieve a small entire system and a wide angle of view. When the negative refractive power of the second lens unit L2 is too strong and f2/fw exceeds the upper limit of Conditional Expression (1) (when an absolute value of the negative refractive power is large), field curvature and chromatic aberration are increased over the entire zoom range, and it is difficult to correct those various aberrations. When the negative refractive power of the second lens unit L2 is too weak and f2/fw falls below the lower limit of Conditional Expression (1), it is difficult to provide a wider angle of view. In addition, the movement amount of the second lens unit L2 during zooming is increased and the total length of the zoom lens is thus increased. Further, the effective diameter of a front lens is increased in size, and hence it is difficult to downsize the entire system.

Conditional Expression (2) is intended to appropriately set the refractive powers of the second lens unit L2 and the third lens unit L3. Both of the second lens unit L2 and the third lens unit L3 serve as lens units configured to provide a magnification varying effect. Thus, appropriately setting the conditions of the refractive powers of the second lens unit L2 and the third lens unit L3 facilitates the provision of a higher zoom ratio. When the refractive power of the second lens unit L2 and the refractive power of the third lens unit L3 are too weak and $\sqrt{(-f2 \times f3)}/ft$ exceeds the upper limit of Conditional Expression (2), the movement amounts of the second lens unit L2 and the third lens unit L3 during zooming are increased and the total length of the zoom lens is thus increased.

When the refractive power of the second lens unit L2 and the refractive power of the third lens unit L3 are too strong and $\sqrt{(-f2 \times f3)}/ft$ falls below the lower limit of Conditional Expression (2), spherical aberration and coma are increased when increasing an aperture ratio (reducing Fno), resulting in a deterioration in optical characteristics. It is more preferred to limit the numerical value ranges of Conditional Expressions (1) and (2) as follows.

$$-3.10 < f2/fw < -1.94 \quad (1a)$$

$$0.40 < \sqrt{(-f2 \times f3)}/ft < 0.62 \quad (2a)$$

A zoom lens employing the configuration described above has high optical characteristics and achieves a small entire system, a wide angle of view, a higher zoom ratio, and a small F number at the wide angle end. In each Example, it is more preferred to satisfy at least one of the following conditional expressions.

The second lens unit L2 includes at least one positive lens, and a refractive index and an Abbe number of a material of the positive lens of the second lens unit L2 are represented by Nd2p and νd2p, respectively. In this case, the material of at least one positive lens satisfies at least one of Conditional Expression (3) or (4). Further, the movement amount of the second lens unit L2 in the zooming from the wide angle end to the telephoto end is represented by M2, and the movement amount of the third lens unit L3 in the zooming from the wide angle end to the telephoto end is represented by M3. The "movement amount of lens unit" as used herein means a difference (absolute value) between positions of each lens unit on the optical axis at zoom positions of the wide angle end and the telephoto end. The total length of the zoom lens at the wide angle end is represented by OAL.

The third lens unit L3 includes at least three positive lenses, and the largest Abbe number of Abbe numbers of materials of the positive lenses of the third lens unit L3 is represented by νd3P. The first lens unit L1 consists of one positive lens, and a focal length of the first lens unit L1 is represented by f1. In this case, it is preferred to satisfy at least one of the following conditional expressions.

$$1.84 < Nd2p \quad (3)$$

$$\nu d2p < 25.0 \quad (4)$$

$$0.32 < (M2+M3)/OAL < 0.60 \quad (5)$$

$$63.0 < \nu d3P \quad (6)$$

$$-1.00 < f2/f3 < -0.60 \quad (7)$$

$$-15.0 < f1/f2 < -5.0 \quad (8)$$

Besides the above conditional expressions, it is preferred to satisfy the following conditional expression when the zoom lens of the present invention is used in an image pickup apparatus including an image pickup element configured to receive light of an image formed by the zoom lens. The maximum angle of view at the wide angle end is represented by ωW, the maximum angle of view at the telephoto end is represented by ωT, a lateral magnification of the third lens unit at the wide angle end is represented by β3w, and a lateral magnification of the third lens unit at the telephoto end is represented by β3t. In this case, it is preferred to satisfy the following conditional expression.

$$0.8 < (\tan \omega W/\tan \omega T)/(\beta 3t/\beta 3w) < 1.6 \quad (9)$$

The technical meaning of each conditional expression is described next.

Conditional Expressions (3) and (4) define a material of at least one positive lens G2p of the second lens unit L2. When Nd2p falls below the lower limit of Conditional Expression (3), spherical aberration is not sufficiently corrected at the telephoto end. In addition, the positive lens G2p is required to have a large thickness in order to obtain a predetermined refractive power of the positive lens G2p, and hence it is difficult to downsize the entire system. Conditional Expression (4) relates to correction of lateral chromatic aberration, and is mainly intended to correct lateral chromatic aberration generated in a negative lens of the second lens unit L2. When νd2p exceeds the upper limit of Conditional Expression (4), lateral chromatic aberration is not sufficiently corrected.

Conditional Expression (5) relates to the movement amounts of the second lens unit L2 and the third lens unit L3 during zooming. A movement amount M2 means a difference (absolute value) between positions of the second lens unit L2 on the optical axis at zoom positions of the wide angle end and the telephoto end, and a movement amount M3 means a difference (absolute value) between positions of the third lens unit L3 on the optical axis at zoom positions of the wide angle end and the telephoto end. When the sum of the movement amounts of the second lens unit L2 and the third lens unit L3 to the total length of the zoom lens is large and (M2+M3)/OAL exceeds the upper limit of Conditional Expression (5), it is difficult to secure space for arranging each lens for correcting various aberrations.

When the sum of the movement amounts of the second lens unit L2 and the third lens unit L3 is small and (M2+M3)/OAL falls below the lower limit of Conditional Expression (5), a predetermined zoom ratio is achieved with small movement amounts. Thus, the negative refractive power of the second lens unit L2 and the positive refractive power of the third lens unit L3 are required to be strong. As a result, various aberrations, in particular, field curvature and lateral chromatic aberration are increased. Conditional Expression (6) relates to the materials of the positive lenses of the third lens unit L3, and is intended to satisfactorily correct axial chromatic aberration. In general, when axial chromatic aberration is increased, color bleeding occurs to degrade the resolving power of zoom lens.

In the zoom lens of the present invention, an axial light flux enters the lens of the third lens unit L3 on the object side at a position relatively high from the optical axis. Thus, a positive lens made of a material satisfying Conditional Expression (6) is used as this lens in each Example so that axial chromatic aberration can be effectively corrected. When vd3P falls below the lower limit of Conditional Expression (6), axial chromatic aberration is not sufficiently corrected, with the result that the resolving power is degraded.

Conditional Expression (7) defines a relationship between the focal length of the third lens unit L3 serving as a main magnification varying lens unit and the focal length of the second lens unit L2 that is required to have a relatively strong negative refractive power for providing a wider angle of view. When the positive refractive power of the third lens unit L3 is weak and f2/f3 exceeds the upper limit of Conditional Expression (7), the movement amount of the third lens unit L3 during zooming is increased, and hence it is difficult to downsize the entire system. When the positive refractive power of the third lens unit L3 is too strong and f2/f3 falls below the lower limit of Conditional Expression (7), spherical aberration is increased.

Conditional Expression (8) defines a ratio of the refractive power of the first lens unit L1 and the refractive power of the second lens unit L2. The first lens unit L1 having a positive refractive power is configured to correct axial chromatic aberration generated in the second lens unit L2 having a strong negative refractive power. Further, the first lens unit L1 is a lens unit having the largest lens effective diameter. Thus, the first lens unit L1 preferably consists of one lens in order to downsize the entire system.

When the positive refractive power of the first lens unit L1 is too strong and f1/f2 exceeds the upper limit of Conditional Expression (8), axial chromatic aberration is increased. When the positive refractive power of the first lens unit L1 is too weak and f1/f2 falls below the lower limit of Conditional Expression (8), axial chromatic aberration is not sufficiently corrected. Further, the first lens unit L1 is increased in size, and hence it is difficult to downsize the entire system.

Conditional Expression (9) defines a change in image pickup angle of view of the third lens unit L3 during zooming, which serves as the main magnification varying lens unit. The image pickup angle of view ωW and the image pickup angle of view ωT indicate an image pickup possible range including distortion. When (tan ωW/tan ωT)/(β3t/β3w) exceeds the upper limit of Conditional Expression (9), distortion is increased at the wide angle end, and deformation and compression of the shape of an object in a taken image is increased, which is not preferred in view of the optical characteristics. When (tan ωW/tan ωT)/(β3t/β3w) falls below the lower limit of Conditional Expression (9), it is difficult to obtain a change in image pickup angle of view by zooming (higher zoom ratio). It is more preferred to set the numerical value ranges of Conditional Expressions (3) to (9) as follows.

$$1.90 < Nd2p \tag{3a}$$

$$vd2p < 20.0 \tag{4a}$$

$$0.37 < (M2+M3)/OAL < 0.55 \tag{5a}$$

$$67.0 < vd3P \tag{6a}$$

$$-0.96 \leq f2/f3 < -0.65 \tag{7a}$$

$$-13.0 \leq f1/f2 < -5.5 \tag{8a}$$

$$0.9 < (\tan \omega W/\tan \omega T)/(\beta 3t/\beta 3w) < 1.4 \tag{9a}$$

In each Example, the first lens unit L1 includes at least one positive lens. The second lens unit L2 consists, in order from the object side to the image side, of a negative lens, a negative lens, and a positive lens. In a zoom lens according to each of Examples 1 to 3, the third lens unit L3 consists, in order from the object side to the image side, of a positive lens, a positive lens, a negative lens, and a positive lens. In a zoom lens according to Example 4, the third lens unit L3 consists, in order from the object side to the image side, of a positive lens, a positive lens, a negative lens, a positive lens, and a negative lens. Now, lens structures of respective Examples are described. Until otherwise noted, the lenses are arranged from the object side to the image side in the lens structures.

Example 1

The first lens unit L1 consists of a biconvex positive lens G11. The positive lens G11 is made of a material having relatively low dispersion characteristics in order to correct axial chromatic aberration. The first lens unit L1 is configured not to move during zooming. The second lens unit L2 consists of a biconcave negative lens G21, a biconcave negative lens G22, and a biconvex positive lens G23. The second lens unit L2 includes a plurality of lenses having strong negative refractive powers in order to provide a wider angle of view.

The third lens unit L3 consists of a biconvex positive lens G31, a biconvex positive lens G32, a biconcave negative lens G33, and a biconvex positive lens G34. The positive lens G32 and the negative lens G33 are cemented to each other to form a cemented lens. A difference in Abbe number of materials of the positive lens G32 and the negative lens G33 is set to be large (difference of 15 or more) so that chromatic aberration can be satisfactorily corrected. In addition, the positive lens G34 is made of a material having low dispersion characteristics (large Abbe number) (Abbe number of 80 or more) so that axial chromatic aberration can be more satisfactorily corrected. Further, both the surfaces of the positive lens G31 have aspherical shapes.

As described above, the aspherical surfaces are appropriately arranged in the third lens unit L3 at which an axial light flux for determining an F number (Fno) spreads so that spherical aberration, which tends to be increased along an increase in aperture ratio, can be satisfactorily corrected. An aperture stop SP is arranged in the third lens unit L3 closest to the object side, and is configured to move in conjunction with the third lens unit L3 (along the same locus) during zooming.

Example 2

The first lens unit L1 has the same lens structure as in Example 1. The second lens unit L2 has the same lens structure as in Example 1. The third lens unit L3 has the same lens structure as in Example 1. The aperture stop SP is arranged between the second lens unit L2 and the third lens unit L3, and is configured not to move during zooming.

Example 3

The first lens unit L1 consists of a positive meniscus lens G11 having a convex surface facing the object side. Here, both the surfaces of the positive lens G11 have aspherical shapes, and hence astigmatism is satisfactorily corrected at the wide angle end and spherical aberration is satisfactorily corrected at the telephoto end. The second lens unit L2 consists of a negative meniscus lens G21 having a convex surface facing the object side, a biconcave negative lens G22, and a biconvex positive lens G23. The negative lens G22 and the positive lens G23 are cemented to each other to form a cemented lens.

The third lens unit L3 consists of a biconvex positive lens G31, a positive meniscus lens G32 having a convex surface facing the object side, a negative meniscus lens G33 having a convex surface facing the object side, and a biconvex positive lens G34. The positive lens G32 and the negative lens G33 are cemented to each other to form a cemented lens. Further, both the surfaces of the positive lens G31 have aspherical shapes.

Example 4

The first lens unit L1 has the same lens structure as in Example 1. The second lens unit L2 consists of a negative meniscus lens G21 having a convex surface facing the object side, a biconcave negative lens G22, and a positive meniscus lens G23 having a convex surface facing the object side. Both the surfaces of the negative lens G21 have aspherical shapes, and hence astigmatism and field curvature are satisfactorily corrected.

The third lens unit L3 consists of a biconvex positive lens G31, a biconvex positive lens G32, a biconcave negative lens G33, a negative meniscus lens G34 having a convex surface facing the object side, and a biconvex positive lens G35. The positive lens G32 and the negative lens G33 are cemented to each other to form a cemented lens. Further, both the surfaces of the positive lens G31 have aspherical shapes.

Next, FIG. 9 is a cross-sectional view of a main part of a monitoring camera (image pickup apparatus) 17 in which a zoom lens 16 corresponding to the zoom lens according to Example 1 of the present invention is used together with a dome cover 15, which is an exemplary case. The dome cover 15 is made of a plastic material such as polymethyl methacrylate (PMMA) or polycarbonate (PC), and is molded into a substantially concentric shape having a thickness of about a few millimeters. Accordingly, when the image pickup apparatus 17 is supposed to be equipped with the dome cover 15, it is preferred that the zoom lens 16 be designed to correct various aberrations, taking the influence of the dome cover 15 (focal length and material) into consideration.

Each of FIG. 10A and FIG. 10B is a schematic view of a main part of the image pickup apparatus (monitoring camera) 17 in which the zoom lens of the present invention is used as an image pickup optical system. In FIG. 10A, a monitoring camera body 11 has a built-in solid-state image pickup element (photo-electric conversion element) 12 configured to receive light of object images formed by the image pickup optical system (zoom lens) 16. The solid-state image pickup element 12 is, for example, a CCD sensor or a CMOS sensor. A memory portion 13 records information corresponding to the subject image that has been photo-electrically converted by the solid-state image pickup element 12. A network cable 14 transfers the subject image that has been captured and photo-electrically converted by the solid-state image pickup element 12.

FIG. 10B is a schematic view of the image pickup apparatus 17 in which the zoom lens is covered with the dome cover 15 is mounted on a ceiling for use.

The image pickup apparatus 17 of the present invention is not limited to a monitoring camera, and may be a video camera, a digital camera, or the like.

As described above, according to each Example, it is possible to obtain a zoom lens that achieves a small entire system, a wide angle of view, a high zoom ratio, and a small F number Fno at the wide angle end, and an image pickup apparatus including the zoom lens.

In each Example, the following configurations may be adopted.

Changing each lens shape and the number of lenses as appropriate without limiting to those described in each Example.

Correcting an image blur accompanying a vibration such as camera shake by moving some of the lenses and the lens units so as to have a component in a direction perpendicular to the optical axis.

Correcting the distortions and the chromatic aberration by an electric correction unit.

Although the exemplary embodiments of the present invention have been described so far, the present invention is by no means limited to those embodiments or optical specifications (angle of field and Fno), and hence various changes can be made within the scope of the subject matter of the present invention.

Next, numerical value data corresponding respectively to Examples are described. In each of the numerical value data, surface number i indicates the order of an optical plane from the object side. Symbol ri represents a curvature radius of the optical plane; di, a plane interval; and ndi and vdi, a refractive index and an Abbe constant of a material of an optical member with respect to the d-line, respectively. Symbol * represents the aspherical lens. Further, two optical planes that are the closest to the image side are a glass member such as face plates. Back focus (BF) is an air-converted distance between a final lens surface and a paraxial image plane. The total lens length is a value obtained by adding the back focus (BF) to a distance between a front lens surface and the final lens surface.

Values of an interval d9 in the numerical value data of Examples 1 and 4, and an interval d8 in the numerical value data of Example 3 are negative because the aperture stop and the third lens unit are counted in order from the object side to the image side. In addition, symbol K represents an eccentricity, symbols A4, A6, A8, A10, and A12 represent aspherical coefficients, and a displacement in the optical axis direction at a position of height H from the optical axis with respect to a surface apex is represented by symbol x. Then, an aspherical shape is expressed by the following expression.

$$X = \frac{(1/R)H^2}{1+\sqrt{1-(1+K)(H/R)^2}} + A4H^4 + A6H^6 + A8H^8 + A10H^{10} + A12H^{12}$$

where R represents a paraxial curvature radius. Further, for example, the expression of "e-Z" means "$10^{-Z}$". In addition, a relationship between the conditional expressions described above and Examples is shown in Table 1. Symbol Fno represents the F number, and the half angle of field (ω) is a numerical value concerning an angle of field that can be imaged in consideration of an amount of distortion.

Example 1

Surface data

| Surface Number | r | d | nd | vd |
|---|---|---|---|---|
| 1 | 17.446 | 1.5 | 1.48749 | 70.2 |
| 2 | −86.687 | (Variable) | | |
| 3 | −25.107 | 0.4 | 1.90043 | 37.4 |
| 4 | 4.734 | 1.88 | | |
| 5 | −6.754 | 0.4 | 1.69895 | 30.1 |
| 6 | 51.104 | 0.15 | | |
| 7 | 19 | 0.97 | 1.95906 | 17.5 |
| 8 | −17.524 | (Variable) | | |
| 9 (Stop) | ∞ | −0.35 | | |
| 10* | 4.204 | 1.97 | 1.55332 | 71.7 |
| 11* | −12.307 | 0.15 | | |
| 12 | 7.707 | 1.51 | 1.80400 | 46.6 |
| 13 | −16.8 | 0.4 | 1.90366 | 31.3 |
| 14 | 3.31 | 0.91 | | |
| 15 | 5.599 | 1.42 | 1.49700 | 81.5 |
| 16 | −6.979 | (Variable) | | |
| 17 | ∞ | 0.8 | 1.51633 | 64.1 |
| Image plane | ∞ | 2.25 | | |

Aspherical surface data

Tenth surface

K = 0.00000e+000  A4 = −1.55023e−003  A6 = −5.03207e−005
A8 = 5.29481e−006  A10 = −5.55677e−007  A12 = −8.06402e−009

Eleventh surface

K = 0.00000e+000  A4 = 1.41613e−003  A6 = −4.31609e−005
A8 = 7.08586e−006  A10 = −5.73409e−007

Various data
Zoom ratio 4.30

| | Wide angle | Intermediate | Telephoto |
|---|---|---|---|
| Focal length | 2.18 | 6.17 | 9.4 |
| F number | 1.45 | 1.92 | 2.4 |
| Half angle of view (degree) | 45.6 | 14.4 | 9.53 |
| Image height | 1.58 | 1.58 | 1.58 |
| Total lens length | 28.52 | 28.52 | 28.52 |
| BF (in air) | 4.28 | 6.91 | 9.55 |
| d2 | 0.75 | 6.73 | 6.67 |
| d8 | 12.17 | 3.56 | 0.99 |
| d16 | 1.50 | 4.13 | 6.77 |

Focal length of units

| Unit | Focal length |
|---|---|
| 1 | 29.93 |
| 2 | −4.51 |
| 3 | 6.09 |

Example 2

Surface data

| Surface Number | r | d | nd | vd |
|---|---|---|---|---|
| 1 | 17.144 | 1.63 | 1.48749 | 70.2 |
| 2 | −98.375 | (Variable) | | |
| 3 | −52.374 | 0.4 | 1.72825 | 28.5 |
| 4 | 3.958 | 1.9 | | |
| 5 | −6.767 | 0.4 | 1.60311 | 60.6 |
| 6 | 27.157 | 0.29 | | |
| 7 | 14.121 | 0.98 | 1.95906 | 17.5 |
| 8 | −43.909 | (Variable) | | |
| 9 (Stop) | ∞ | (Variable) | | |
| 10* | 4.282 | 2.23 | 1.55332 | 71.7 |
| 11* | −10.588 | 0.15 | | |
| 12 | 6.209 | 1.29 | 1.69680 | 55.5 |
| 13 | −25.91 | 0.4 | 1.90366 | 31.3 |
| 14 | 3.358 | 0.81 | | |
| 15 | 6.084 | 1.56 | 1.49700 | 81.5 |
| 16 | −7.195 | (Variable) | | |
| 17 | ∞ | 0.8 | 1.51633 | 64.1 |
| Image plane | ∞ | 1.39 | | |

Aspherical surface data

Tenth surface

K = 0.00000e+000  A4 = −1.52668e−003  A6 = −2.88651e−005
A8 = 6.86983e−007  A10 = −3.15130e−008  A12 = −1.68919e−008

Eleventh surface

K = 0.00000e+000  A4 = 1.50995e−003  A6 = −3.93642e−005
A8 = 6.11169e−006  A10 = −3.77849e−007

Various data
Zoom ratio 4.02

| | Wide angle | Intermediate | Telephoto |
|---|---|---|---|
| Focal length | 2.19 | 5.66 | 8.79 |
| F number | 1.45 | 1.87 | 2.56 |
| Half angle of view (degree) | 44.1 | 15.5 | 10.1 |
| Image height | 1.58 | 1.58 | 1.58 |
| Total lens length | 28.52 | 28.52 | 28.52 |
| BF (in air) | 3.92 | 5.92 | 7.92 |
| d2 | 0.49 | 6.65 | 7.46 |
| d8 | 7.96 | 1.8 | 0.99 |
| d9 | 4.12 | 2.12 | 0.12 |
| d16 | 2.00 | 4.00 | 6.00 |

Focal length of units

| Unit | Focal length |
|---|---|
| 1 | 30.09 |
| 2 | −4.74 |
| 3 | 5.95 |

Example 3

Surface data

| Surface Number | r | d | nd | vd |
|---|---|---|---|---|
| 1* | 12.887 | 1.5 | 1.55332 | 71.7 |
| 2* | 48.829 | (Variable) | | |
| 3 | 80.64 | 0.4 | 1.90043 | 37.4 |
| 4 | 5.862 | 2.79 | | |
| 5 | −5.447 | 0.4 | 1.54814 | 45.8 |
| 6 | 24.139 | 0.8 | 1.95906 | 17.5 |
| 7 | −25.441 | (Variable) | | |

-continued

| | | | | |
|---|---|---|---|---|
| 8 (Stop) | ∞ | −0.35 | | |
| 9* | 4.435 | 2.15 | 1.55332 | 71.7 |
| 10* | −16.222 | 0.15 | | |
| 11 | 7.682 | 0.85 | 1.88300 | 40.8 |
| 12 | 11.58 | 0.4 | 1.80518 | 25.4 |
| 13 | 3.452 | 1.59 | | |
| 14 | 5.862 | 1.96 | 1.43700 | 95.1 |
| 15 | −7.769 | (Variable) | | |
| 16 | ∞ | 0.8 | 1.51633 | 64.1 |
| Image plane | ∞ | 2.62 | | |

Aspherical surface data

First surface $K = 0.00000e+000$  $A4 = -1.60374e-004$  $A6 = -2.24295e-006$
$A8 = -3.44704e-008$  $A10 = 1.45425e-009$ Second surface $K = 0.00000e+000$  $A4 = -1.81935e-004$  $A6 = -3.84578e-006$
$A8 = 9.03256e-008$ Ninth surface $K = 0.00000e+000$  $A4 = -1.14243e-003$  $A6 = -5.74163e-005$
$A8 = 5.55308e-006$  $A10 = -3.77310e-007$  $A12 = -3.43206e-009$ Tenth surface $K = 0.00000e+000$  $A4 = 1.12743e-003$  $A6 = -3.38300e-005$
$A8 = 5.23239e-006$  $A10 = -3.26660e-007$ Various data
Zoom ratio 4.94

| | Wide angle | Intermediate | Telephoto |
|---|---|---|---|
| Focal length | 2.4 | 7.58 | 11.85 |
| F number | 1.49 | 2.0 | 2.5 |
| Half angle of view (degree) | 43.2 | 12.1 | 7.7 |
| Image height | 1.58 | 1.58 | 1.58 |
| Total lens length | 32.55 | 32.55 | 32.55 |
| BF (in air) | 4.65 | 7.43 | 10.21 |
| d2 | 0.47 | 8.22 | 8.56 |
| d7 | 14.78 | 4.25 | 1.13 |
| d15 | 1.50 | 4.28 | 7.05 |

Focal length of units

| Unit | Focal length |
|---|---|
| 1 | 31.18 |
| 2 | −5.05 |
| 3 | 6.84 |

Example 4

Surface data

| Surface Number | r | d | nd | νd |
|---|---|---|---|---|
| 1 | 50.292 | 1.5 | 1.48749 | 70.2 |
| 2 | −88.629 | (Variable) | | |
| 3* | 28.4 | 0.4 | 1.85135 | 40.1 |
| 4* | 7.009 | 2.7 | | |
| 5 | −8.979 | 0.4 | 1.59522 | 67.7 |
| 6 | 17.094 | 0.15 | | |
| 7 | 11.95 | 0.95 | 1.95906 | 17.5 |
| 8 | 29.969 | (Variable) | | |
| 9 (Stop) | ∞ | −0.35 | | |
| 10* | 4.467 | 2.2 | 1.55332 | 71.7 |
| 11* | −18.525 | 0.15 | | |
| 12 | 6.786 | 1.4 | 1.90043 | 37.4 |
| 13 | −30.931 | 0.4 | 1.85478 | 24.8 |
| 14 | 3.216 | 1.1 | | |
| 15 | 5.792 | 0.4 | 1.49700 | 81.5 |
| 16 | 3.993 | 0.25 | | |
| 17 | 4.305 | 1.45 | 1.58144 | 40.8 |
| 18 | −111.628 | (Variable) | | |
| 19 | ∞ | 0.8 | 1.51633 | 64.1 |
| Image plane | ∞ | 2.18 | | |

Aspherical surface data

Third surface $K = 0.00000e+000$  $A4 = -9.02943e-004$  $A6 = 7.14054e-005$
$A8 = -1.22365e-006$ Fourth surface $K = 0.00000e+000$  $A4 = -7.59752e-004$  $A6 = 8.19542e-005$
$A8 = -4.11580e-007$  $A10 = 1.34611e-007$ Tenth surface $K = 0.00000e+000$  $A4 = -1.15131e-003$  $A6 = -8.43653e-005$
$A8 = 7.80854e-006$  $A10 = -8.08848e-007$  $A12 = 2.83415e-008$ Eleventh surface $K = 0.00000e+000$  $A4 = 7.10733e-004$  $A6 = -5.80347e-005$
$A8 = 6.64499e-006$  $A10 = -4.86651e-007$  $A12 = 2.23404e-008$ Various data
Zoom ratio 6.52

| | Wide angle | Intermediate | Telephoto |
|---|---|---|---|
| Focal length | 2.22 | 8.9 | 14.49 |
| F number | 1.51 | 2.35 | 3.2 |
| Half angle of view (degree) | 45.3 | 10.1 | 6.2 |
| Image height | 1.58 | 1.58 | 1.58 |
| Total lens length | 36.78 | 36.78 | 36.78 |
| BF (in air) | 3.71 | 8.27 | 12.83 |
| d2 | 0.23 | 11.35 | 9.60 |
| d8 | 19.47 | 3.79 | 0.98 |
| d18 | 1.00 | 5.56 | 10.12 |

Focal length of units

| Unit | Focal length |
|---|---|
| 1 | 66.05 |
| 2 | −6.42 |
| 3 | 6.78 |

TABLE 1

| | Conditional Expression | Example 1 | Example 2 | Example 3 | Example 4 |
|---|---|---|---|---|---|
| (1) | f2/fw | −2.066 | −2.170 | −2.102 | −2.886 |
| (2) | √(−f2 × f3)/ft | 0.558 | 0.605 | 0.496 | 0.455 |
| (3) | Nd2p | 1.959 | 1.959 | 1.959 | 1.959 |
| (4) | νd2p | 17.47 | 17.47 | 17.47 | 17.47 |
| (5) | (M2 + M3)/OAL | 0.388 | 0.381 | 0.416 | 0.503 |
| (6) | νd3P | 81.5 | 81.5 | 95.1 | 71.7 |
| (7) | f2/f3 | −0.741 | −0.797 | −0.738 | −0.947 |
| (8) | f1/f2 | −6.633 | −6.344 | −6.178 | −10.286 |
| (9) | (tanωW/tanωT)/(β3t/β3w) | 1.074 | 1.229 | 1.349 | 1.041 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163564, filed Aug. 21, 2015, which is hereby incorporated by reference herein in its entirety.

What is claimed is:

1. A zoom lens, comprising, in order from an object side to an image side:
   a first lens unit having a positive refractive power;
   a second lens unit having a negative refractive power; and
   a third lens unit having a positive refractive power,
   wherein during zooming, the first lens unit is configured not to move, and the second lens unit and the third lens unit are configured to move along mutually different loci,
   wherein the second lens unit comprises at least one positive lens, and
   wherein the following conditional expressions are satisfied:

$-3.20 < f2/fw < -1.88;$ $0.35 < \sqrt{(-f2 \times f3)}/ft < 0.65;$ $1.90 < Nd2p;$ and $vd2p < 20.0,$ where fw represents a focal length of the zoom lens at a wide angle end, ft represents a focal length of the zoom lens at a telephoto end, f2 represents a focal length of the second lens unit, f3 represents a focal length of the third lens unit, and Nd2p and vd2p respectively represent a refractive index and an Abbe number of a material of the at least one positive lens of the second lens unit.

2. A zoom lens according to claim 1, wherein the following conditional expression is satisfied:

$0.32 < (M2+M3)/OAL < 0.60,$ where M2 represents a movement amount of the second lens unit in zooming from the wide angle end to the telephoto end, M3 represents a movement amount of the third lens unit in the zooming from the wide angle end to the telephoto end, and OAL represents a total length of the zoom lens at the wide angle end.

3. A zoom lens according to claim 1,
   wherein the third lens unit comprises at least three positive lenses, and
   wherein the following conditional expression is satisfied:

$63.0 < vd3P,$ where vd3P represents a largest Abbe number of Abbe numbers of materials of the at least three positive lenses of the third lens unit.

4. A zoom lens according to claim 1, wherein the following conditional expression is satisfied:

$-1.00 < f2/f3 < -0.60.$

5. A zoom lens according to claim 1, wherein the following conditional expression is satisfied:

$-15.0 < f1/f2 < -5.0,$ where f1 represents a focal length of the first lens unit.

6. A zoom lens according to claim 1, wherein during zooming from the wide angle end to the telephoto end, the second lens unit is configured to move toward the image side and then move toward the object side, and the third lens unit is configured to move toward the object side.

7. A zoom lens according to claim 1, wherein the first lens unit consists of one positive lens.

8. A zoom lens according to claim 1, wherein the second lens unit consists, in order from the object side to the image side, of a negative lens, a negative lens, and a positive lens.

9. A zoom lens according to claim 1, wherein the third lens unit consists, in order from the object side to the image side, of a positive lens, a positive lens, a negative lens, and a positive lens.

10. A zoom lens according to claim 1, wherein the third lens unit consists, in order from the object side to the image side, of a positive lens, a positive lens, a negative lens, a negative lens, and a positive lens.

11. A zoom lens according to claim 1, wherein the zoom lens consists, in order from the object side to the image side, of the first lens unit having a positive refractive power, the second lens unit having a negative refractive power, and the third lens unit having a positive refractive power.

12. An image pickup apparatus, comprising:
    a zoom lens according to claim 1; and
    an image pickup element configured to receive an image formed by the zoom lens.

13. An image pickup apparatus according to claim 12, wherein the following conditional expression is satisfied:

$0.8 < (\tan \omega W/\tan \omega T)/(\beta 3t/\beta 3w) < 1.6,$ where ωW represents a maximum angle of view at the wide angle end, ωT represents a maximum angle of view at the telephoto end, β3w represents a lateral magnification of the third lens unit at the wide angle end, and β3t represents a lateral magnification of the third lens unit at the telephoto end.

14. A zoom lens, comprising, in order from an object side to an image side:
    a first lens unit having a positive refractive power;
    a second lens unit having a negative refractive power; and
    a third lens unit having a positive refractive power,
    wherein during zooming, the first lens unit is configured not to move, and the second lens unit and the third lens unit are configured to move along mutually different loci,
    wherein the third lens unit consists, in order from the object side to the image side, of a positive lens, a positive lens, a negative lens, a negative lens, and a positive lens, and
    wherein the following conditional expressions are satisfied:

$-3.20 < f2/fw < -1.88;$ and $0.35 < \sqrt{(-f2 \times f3)}/ft < 0.65,$ where fw represents a focal length of the zoom lens at a wide angle end, ft represents a focal length of the zoom lens at a telephoto end, f2 represents a focal length of the second lens unit, and f3 represents a focal length of the third lens unit.

15. An image pickup apparatus, comprising:
    a zoom lens according to claim 14; and
    an image pickup element configured to receive an image formed by the zoom lens.

* * * * *